United States Patent
Lovell, Jr.

(10) Patent No.: US 8,055,283 B2
(45) Date of Patent: **\*Nov. 8, 2011**

(54) SYSTEM AND METHOD FOR MESSAGE-BASED INTERACTIVE SERVICES

(75) Inventor: Robert C. Lovell, Jr., Leesburg, VA (US)

(73) Assignee: Sybase 265, Inc., Reston, VA (US)

( * ) Notice: Subject to any disclaimer, the term of this patent is extended or adjusted under 35 U.S.C. 154(b) by 566 days.

This patent is subject to a terminal disclaimer.

(21) Appl. No.: 11/098,405

(22) Filed: Apr. 5, 2005

(65) Prior Publication Data

US 2005/0260993 A1 Nov. 24, 2005

Related U.S. Application Data

(60) Provisional application No. 60/571,926, filed on May 18, 2004.

(51) Int. Cl.
*H04W 4/00* (2009.01)

(52) U.S. Cl. ............... 455/466; 455/414.1; 455/420; 455/419

(58) Field of Classification Search ............ 455/466, 455/414, 406, 407, 408, 414.1, 419, 420
See application file for complete search history.

(56) References Cited

U.S. PATENT DOCUMENTS

| | | | |
|---|---|---|---|
| 6,292,669 B1 * | 9/2001 | Meuronen et al. | 455/466 |
| 6,647,256 B1 * | 11/2003 | Stewen et al. | 455/414.1 |
| 7,110,954 B2 | 9/2006 | Yung et al. | |
| 7,403,788 B2 * | 7/2008 | Trioano et al. | 455/466 |
| 2002/0128932 A1 * | 9/2002 | Yung et al. | 705/27 |
| 2003/0126076 A1 * | 7/2003 | Kwok et al. | 705/40 |
| 2003/0134614 A1 * | 7/2003 | Dye | 455/406 |
| 2003/0179746 A1 * | 9/2003 | Moon et al. | 370/352 |
| 2004/0083166 A1 * | 4/2004 | Pailles | 705/40 |
| 2004/0235450 A1 * | 11/2004 | Rosenberg | 455/406 |
| 2005/0003837 A1 * | 1/2005 | Midkiff et al. | 455/466 |

FOREIGN PATENT DOCUMENTS

CN 1384459 A 12/2002

OTHER PUBLICATIONS

Roland Piquepaille's Technology Trends "(Students Watch Web to Do Their Laundry)", http://www.primidi.com/2004/02/08.html.
Chinese Office Action, Mar. 1, 2010 (11 pages).

* cited by examiner

*Primary Examiner* — Kwasi Karikari

(74) *Attorney, Agent, or Firm* — Edell, Shapiro & Finnan, LLC

(57) ABSTRACT

A method and system for providing message-based interactive services includes receiving a short code message from a mobile subscriber relating to a service desired by the mobile subscriber from an interactive service device, routing the short code message for processing, and instructing the interactive service device to operate in accordance with the short code message.

25 Claims, 2 Drawing Sheets

SYSTEM AND METHOD FOR MESSAGE-BASED INTERACTIVE SERVICES

This application claims the benefit of U.S. Provisional Application No. 60/571,926, filed May 18, 2004, which is herein incorporated by reference in its entirety.

BACKGROUND

1. Field of the Invention

The present invention relates generally to telecommunications services. More particularly, the present invention relates to systems and methods for providing services that are initiated or controlled using messaging, such as the short message service (SMS) available through mobile telephony.

2. Background of the Invention

As mobile telephones become even more ubiquitous, there exists an opportunity to leverage the ever-increasing ability to "connect" directly with consumers who are in the position to purchase goods and services, but who may not be in a position to interface directly with a merchant or point-of-sale terminal.

There is therefore a constant need to provide improved and more efficient systems and methods for allowing consumers to gain access to goods and services.

BRIEF SUMMARY OF THE INVENTION

According to one exemplary aspect, the present invention relates to a method for providing message-based interactive services, comprising receiving a short code message from a mobile subscriber relating to service desired by the mobile subscriber from an interactive service device, routing the short code message for processing, and instructing the interactive service device to operate in accordance with the short code message.

According to another exemplary aspect of the invention, a method is disclosed for providing message-based interactive services. The method involves receiving a short code message from a mobile subscriber relating to service desired by the mobile subscriber from an interactive service device, routing the short code message to an inter-carrier vendor for processing, and instructing the interactive service device to operate in accordance with the short code message.

According to yet another exemplary aspect of the invention, a system is disclosed for providing message-based interactive services. The system includes a mobile wireless device, an interactive services device, an application provider network, and an inter-carrier vendor network. The system is operable to route a short code message from the mobile wireless device to the application provider network via the inter-carrier vendor network to effectuate a desired service from the interactive service device. These and other features of embodiments of the invention will be more full explained below in conjunction with the drawings.

DETAILED DESCRIPTION OF THE INVENTION

Figure 1:
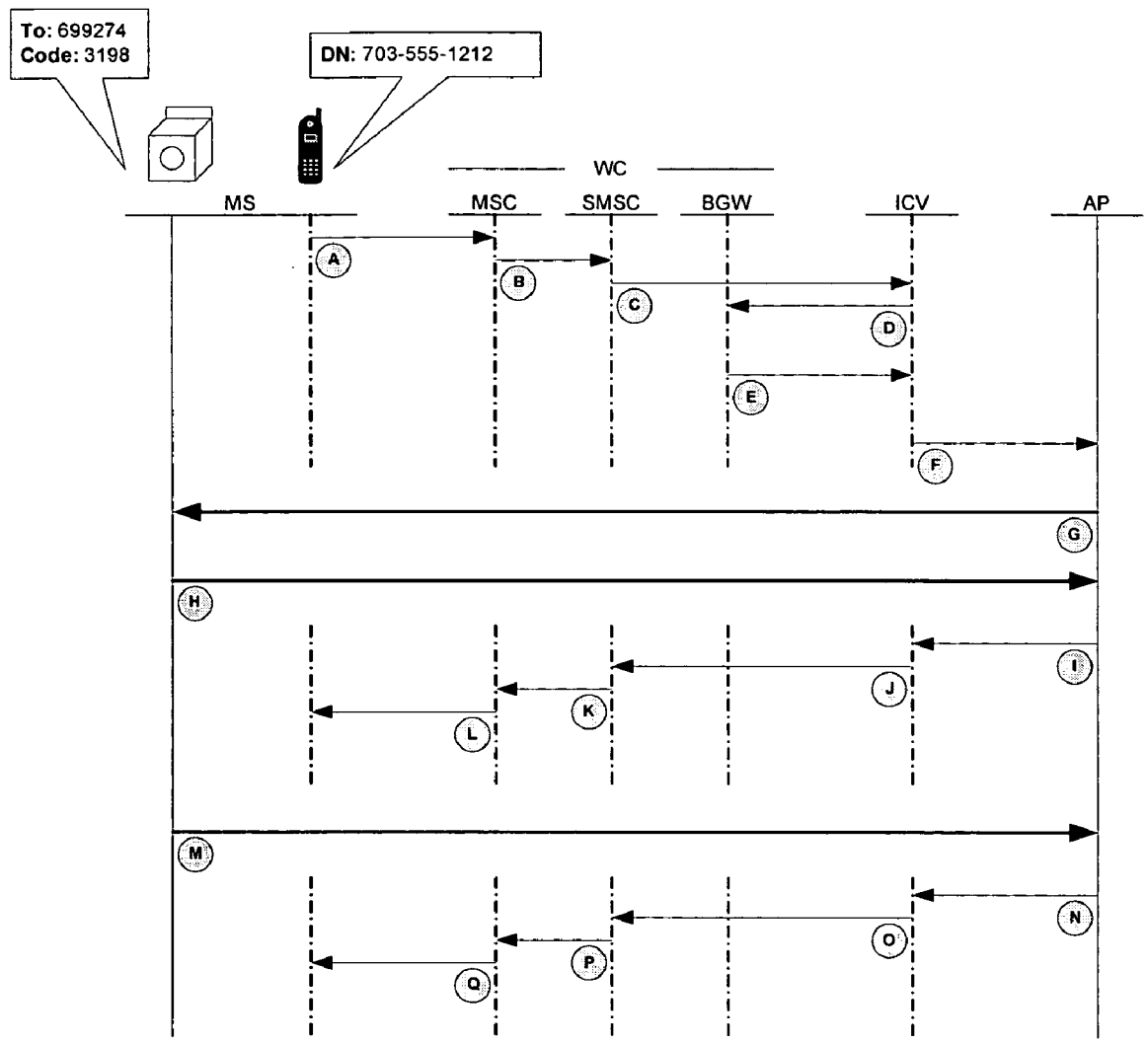
FIG. 1 is a call flow diagram depicting the flow of calls, messages and information in accordance with an embodiment of the present invention.

The acronyms below are used throughout the following description.

| Term | Meaning |
| --- | --- |
| AP | Application Provider |
| API | Application Programming Interface |
| BA | Billing Augmentation |
| BGW | Billing Gateway |
| BS | Base Station |
| CG | Content Gateway |
| CM | Campaign Manager |
| CSC | Common Short Code |
| CSCA | Common Short Code Administrator |
| DN | Directory Number |
| EMI | External Machine Interface |
| HLR | Home Location Register |
| ICV | Inter-Carrier Vendor |
| IP | Internet Protocol |
| IX | InphoXchange |
| LBS | Location-Based Service |
| MMS | Multimedia Message Service |
| MNP | Mobile Number Portability |
| MS | Mobile Subscriber |
| MSC | Mobile Switching Center |
| SMPP | Short Message Peer-to-Peer |
| SMS | Short Message Service |
| SMSC | Short Message Service Center |
| SMTP | Simple Mail Transfer Protocol |
| UCP | Universal Computer Protocol |
| USC | Universal Short Code |
| VLR | Visitor Location Register |

As a result of different implementations of the short message service (SMS) and inadequate connectivity among wireless service providers, especially in the Untied States, one mobile subscriber (MS) might be unable to communicate via SMS with another MS services by a different service provider. To address this problem, an inter-carrier vendor may be employed as a go-between among several service providers. For example, once a given service provider determines that an SMS message initiated in its own network cannot be delivered, that service provider will forward the SMS message to the inter-carrier vendor for appropriate routing. An illustrative example of aspects of an inter-carrier vendor (ICV) may be found in pending U.S. application Ser. No. 10/426,662, entitled "Systems and Methods for Interconnecting Heterogeneous Networks," and Ser. No. 10/831,329 (a continuation-in-part of U.S. application Ser. No. 10/426,662) both of which are incorporated by reference herein.

One aspect of an Inter-Carrier Vendor (ICV) is to support the ongoing development and deployment of services that sit atop of, and thus leverage functions that may be provided by the ICV's capability to route, process, and deliver Short Message Service (SMS) messages. The ICV may also utilize such concepts as a comprehensive content gateway (CG) solution and a comprehensive campaign manager (CM), all of which are described more fully below.

An illustrative example of aspects of the aforementioned comprehensive Content Gateway (CG) solution can be found in pending U.S. application Ser. No. 10/852,101, entitled "Content Gateway," which is incorporated by reference herein.

An illustrative example of aspects of a comprehensive Campaign Manager (CM) platform can be found in pending U.S. application Ser. No. 10/837,696, entitled "Campaign Manager Application-Based Services," which is also incorporated by reference herein.

As described in the cited pending applications, operative elements of the presented solutions may, where appropriate, take advantage of the SMS message routing opportunities that exist through the use of a Universal Short Code (USC) and Billing Augmentation (BA) services.

SMS message routing opportunities exist through the use of a Universal Short Code (USC). An illustrative example of a USC environment may be found in pending U.S. application Ser. No. 10/742,764, entitled "Systems and Methods for a Universal Short Code Administration Facility," and which is incorporated by reference herein. Such common short codes (CSCs) are administered in the US by an organization known as the Common Short Code Administration.

For immediacy of impact and unprecedented levels of consumer involvement, few innovations can rival common short codes (CSCs). Long popular in Europe, CSCs—short strings of numbers to which text messages can be addressed—allow wireless subscribers to access applications on all participating wireless carriers' networks, at any time and give content providers access to approximately 150 million SMS subscribers. The possibilities for this functionality are endless: voting and polling, contests, surveys, direct marketing, chat, games, and the like all can benefit from CSCs.

It is noted that a short code is usually a number to which an SMS or text message can be sent. A short code often has fewer digits than a 10-digit telephone number. For example, a short code could be 54321. A common short code, or CSC, is a short code that is common across all wireless service providers in the U.S. The Common Short Code Administrator (CSCA) assigns CSCs to applicants allowing them to be used for the same application across multiple wireless service providers.

Services, such as the instant Message-Based Interactive Services, fit precisely within the framework outlined by the several patent applications cited herein.

For purposes of illustration consider the following embodiment of a Message-Based Interactive Service, in accordance with the principles of the present invention. Under this illustrative example Jane, a Mobile Subscriber (MS), has visited a local do-it-yourself laundry establishment and has deposited her dirty laundry in one of the available clothes washing machines. The term mobile subscriber as used herein may refer to the person who subscribes to a mobile service, but it may also refer to the mobile wireless device itself that is associated with a particular mobile carrier's network. This definition of mobile subscriber is not intended to be limiting and merely adds on to any plain and ordinary meaning that may be ascribed to the term mobile subscriber.

The telephone number or Directory Number (DN) of Jane's mobile device (e.g., her cellular telephone) is 703-555-1212. A placard on the washing machine that Jane has selected indicates that for Jane to use the machine she should:

Please send a text (SMS) message containing the value 3198 (the unique identifying code of this washing machine) to the address "MyWash" (i.e., the CSC 699274).

FIG. 1 depicts, at a high-level, the interactions that, in accordance with the present invention, typically take place following Jane's dispatch of her SMS message:

(A) Following the instructions that Jane finds on the washing machine Jane dispatches an SMS message from her mobile device to CSC 699274 with the body of her message containing the code 3198 (i.e., the unique code of the specific washing machine that Jane is utilizing). In stylized fashion this message may be represented as:

--- Message Start ---
From: 1-703-555-1212
To: 699274
Body: 3198
---- Message End ----

(B) A Mobile Switching Center (MSC) within Jane's wireless carrier's network environment receives and processes Jane's SMS message and passes the message to a Short Message Service Center (SMSC). (Note that this depiction is intentionally simplified and as a result does not include network elements such as Base Stations [BSs], etc. and the messaging interaction with same.)

(C) The SMSC receives and processes Jane's SMS message. The SMSC examines the destination address of the message, discovers that the destination address is the CSC 699274, determines that that destination resides outside of its environment, and passes the message, along to its ICV for subsequent routing and delivery. It should be readily apparent to one of ordinary skill in the relevant art that numerous proprietary communication mechanisms and/or standards-based communication mechanisms (including, inter alia, Short Message Peer-to-Peer [SMPP], External Machine Interface/Universal Computer Protocol [EMI/UCP], Simple Mail Transfer Protocol [SMTP], etc.) may be utilized to support the SMSC-to-ICV linkage.

(D) The ICV receives and processes the message. The ICV examines the destination address of the message, discovers that the destination address is the CSC 699274, and uses its routing facilities to identify the Application Provider (AP) that is (at that moment in time) associated with CSC 699274. As mentioned above, an illustrative ICV comprehensive routing facility may be found in pending U.S. application Ser. Nos. 10/426,662 and 10/831,329 (a continuation-in-part of pending U.S. application Ser. No. 10/426,662).

While not explicitly illustrated in FIG. 1, the ICV may dispatch an inquiry to the AP to, among other things, validate the body of the received message (3198 in the instant example), confirm that the device that is associated with the supplied code (the washing machine that Jane wishes to use) is available for use, secure the applicable billing parameters from the AP (e.g., if they are not already cached by the ICV), etc. The AP may return a response to the ICV (containing, based on the ICV's inquiry, a positive or negative validation, the applicable billing parameters, etc.). It should be readily apparent to one of ordinary skill in the relevant art that numerous communication mechanisms may be employed to support such an ICV-to-AP message exchange (see, for example, Step C above).

Using the applicable billing parameters the ICV dispatches a billing authorization request to the Billing Gateway (BGW) within the wireless carrier's environment. As described at length in pending U.S. application Ser. No. 10/837,695, which is incorporated by reference herein for any purpose, telecommunication billing systems are traditionally large, slow-changing, closed solutions. As a result, it is frequently a challenge for an external, third-party to (a) obtain access to a carrier's billing system and (b) for the carrier's billing system to offer the features, functions, flexibility, etc. that are required by the third-party.

To address the first impediment that was noted above (i.e., access), the ICV may access a wireless carrier's billing environment directly through a BGW resident within the carrier's environment. Alternatively, the ICV may access a wireless carrier's billing environment indirectly through a third-party facilitator (an example of such a third-party facilitator is Qpass, Inc., Seattle, Wash.). It should be readily apparent to one of ordinary skill in the relevant art that numerous communication mechanisms may be employed to support the associated linkage. In the instant example we assume a direct (ICV→BGW) mechanism.

(E) The BGW receives and processes the message. Among other things, the BGW may generate a line-item, capturing the particulars (date, time, source, destination, amount, etc.) of the instant transaction, said line item ultimately appearing on Jane's monthly statement from the carrier. The BGW dispatches a positive billing authorization response to the ICV. (In the instant example a BGW is employed; as described in Step D above, alternative arrangements are easily possible.)

(F) The ICV receives and processes the message. The ICV dispatches a message, such as a billing confirmation message, to the AP identifying the MS and confirming the successful completion of the billing event. As described in Step C above numerous communication mechanisms are available to support this linkage. As described previously, the message processing, routing, and delivery capabilities of the ICV support this message exchange and it should be readily apparent to one of ordinary skill in the relevant art that numerous mechanisms exist (see, for example, Step C above) to support this message exchange.

(G) The AP receives and processes the message. Among other activities, the AP validates the received message (e.g., confirming that the body of the received message (3198 in the instant example) is structurally correct, valid, etc.; confirming that the device that is associated with the supplied code (the washing machine that Jane wishes to use) is available for use; etc.) and appropriately updates its local repository (e.g., to temporarily associate code 3198 with 703-555-1212 (the DN of Jane's mobile device) in support of Step N below).

The AP then dispatches a 'Start' message to the identified washing machine, which may take the form of an authorization message. For example, the washing machine may reside at an Internet Protocol (IP) address that the AP may access in an open fashion (e.g., via the Internet) or in a closed fashion (e.g., via a private, secured network) and control via a defined set of messages/functions that are exposed through an Application Programming Interface (API). It should be readily apparent to one of ordinary skill in the relevant art that other access and/or control mechanisms are easily possible. In stylized fashion this message may be depicted as:

--- Message Start ---
To: 3198
Action: Start
---- Message End ----

(H) The washing machine receives the message, initiates its wash cycle, and dispatches a positive acknowledgement or response to the AP, which may take the form of an acknowledgement message.

(I) The AP receives and processes the message. The AP formulates and dispatches a service confirmation SMS message (e.g., "Thank you very much for using TechnoWash!") to the ICV for subsequent delivery to the MS (Jane). In stylized fashion this message may be represented as:

--- Message Start ---
From: 699274
To: 1-703-555-1212
Body: Thank you very much for using TechnoWash!
---- Message End ----

It should be readily apparent to one of ordinary skill in the relevant art that numerous mechanisms exist (see, for example, Step C above) to support this message exchange.

(J) The ICV receives and processes the message. The ICV examines the destination address of the message, discovers that the destination address is the telephone number 703-555-1212, uses routing facilities to identify the wireless carrier that (at that moment in time, given the presence of Mobile Number Portability (MNP) regimes) owns or services the telephone number, and passes the message to an SMSC within the identified wireless carrier's environment. See, for example, Steps C and D above for a discussion of the numerous message processing, routing, and delivery particulars for this message exchange.

(K) The SMSC receives and processes the message. The SMSC passes the message along to the MSC that is currently servicing Jane's mobile device. (As described previously, the present depiction is intentionally simplified and as a result does not include network elements such as Home Location Register (HLR), etc. and the messaging interaction with same.)

(L) The MSC receives and processes the message. The MSC delivers the message to Jane's mobile device. (As described previously, the present depiction is intentionally simplified and as a result does not include network elements such as Visitor Location Register (VLR), etc. and the messaging interaction with same.)

(M) When the washing cycle is completed, the washing machine dispatches a 'Done' message to the AP. See, for example, Step G above. In stylized fashion this message may be depicted as:

--- Message Start ---
From: 3198
Action: Done
---- Message End ----

(N) The AP receives and processes the message. The AP utilizes the information in its local repository (that, among other things, temporarily associates code 3198 with 703-555-1212 (the DN of Jane's mobile device)) to formulate and dispatch a notification SMS message (e.g., "Your laundry is done!") to the ICV for subsequent delivery to the MS (Jane). This type of message may also be considered a service confirmation message that denotes completion, rather than initiation of the service. In stylized fashion this message may be represented as:

--- Message Start ---
From: 699274
To: 1-703-555-1212

-continued

> Body: Your laundry is done!
> ---- Message End ----

(O) The ICV receives and processes the message. See Step J above.

(P) The SMSC receives and processes the message. See Step K above.

(Q) The MSC receives and processes the message. See Step L above.

It should be readily apparent to one of ordinary skill in the relevant art that numerous other embodiments are easily possible. For example, other appliances (including, among others, clothes dryers, vending machines, etc.) within the do-it-yourself laundry establishment might be similarly equipped or outfitted. Outside of the Laundromat context, for example, Jane (our MS) may park her car in a parking garage or in front of a parking meter and follow the instructions found on a placard on the instant parking meter which announce that for parking Jane should:

> Please send a text (SMS) message containing the value 2103456 (the unique identifying code of this parking meter) to the address "MyPark" (i.e., the CSC 697275).

Figure 2:
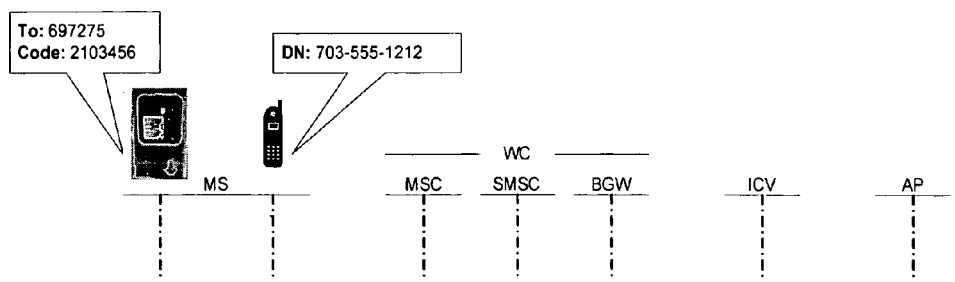
FIG. 2 depicts call flow according to another exemplary embodiment of the present invention.

The messaging interactions for this embodiment would occur under a structure like that shown in FIG. 2, using a similar logic for the actual message routing as shown in FIG. 1. In addition to the above-mentioned devices, it may also be possible to apply the interactive messaging capabilities to operate other devices, such as an ATM machine, an internet kiosk, a pay phone, gas pumps, etc. Practically any device currently operated by coin or credit card or other such automated payment facilities could be augmented to operate using such message-based interactive controls as described herein, although adaptation to the particular interactive device may require minor modifications fully within the scope of one of skill in the art based upon the description contained herein.

It is useful to note that under this embodiment additional messaging opportunities become available. For example, in the message that the AP dispatches to the MS to alert the MS to the impending expiration of the parking meter the AP may optionally allow the MS to re-charge the parking meter for some new interval. Such an action would be accomplished through an additional exchange of request and response messages involving, among others, the AP and the ICV (to request such a re-charge and to positively or negatively acknowledge the completion of same) and between the ICV and the BGW (to request such a re-charge and to positively or negatively acknowledge the completion of same).

It should be readily apparent to one of ordinary skill in the relevant art that other arrangements of the individual embodiments are also easily possible. For example, while there are a range of not-insignificant advantages or benefits that arise from the use of a centralized ICV, including among others:

Ubiquitous message transport across multiple wireless carriers.

Access to wireless carrier billing environments.

Ubiquitous access to APs.

Comprehensive message routing capabilities across and among wireless carriers and APs including native support for things like USCs/CSCs, MNP initiatives that may be active, etc.

it is possible, as one of many conceivable alternatives, for the AP to perform the carrier billing system interaction that was described above in Step D and Step E in the narrative for FIG. 1. There are clearly a number of practical logistical, etc. measures that would arise from such an arrangement.

Additionally, it should be readily apparent to one of ordinary skill in the relevant art that the use of other supportive mobile services may be incorporated into various of the embodiments. For example, a Location-Based Service (LBS) capability might be leveraged during a portion of the previously described messaging exchanges to associate the physical location of the requesting MS with the physical location of the device which the MS is attempting to utilize as part of additional security, fraud protection, etc. controls.

While the narrative that was just presented concerned SMS, it should be obvious to one of ordinary skill in the relevant art that other messaging constructs (e.g., Multimedia Message Service [MMS]) are easily possible.

The foregoing disclosure of the preferred embodiments of the present invention has been presented for purposes of illustration and description. It is not intended to be exhaustive or to limit the invention to the precise forms disclosed. Many variations and modifications of the embodiments described herein should be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing message-based interactive services, comprising:

receiving, at an intercarrier vendor, a short message service (SMS) message from a mobile subscriber relating to service desired by the mobile subscriber from an interactive service device, the SMS message being addressed to a short code and including in a body thereof an identification of the interactive service device, wherein the short code is different from the identification of the interactive service device;

routing the SMS message for processing such that the interactive service device is caused to operate to effect the service desired by the mobile subscriber;

receiving, at the intercarrier vendor, an SMS message addressed to a mobile device of the mobile subscriber indicating that the interactive service device has completed the service desired by the mobile subscriber; and routing the SMS message addressed to the mobile device of the mobile subscriber for delivery to the mobile subscriber, wherein the interactive service device does not communicate via SMS for purposes of being caused to operate to effect the service desired by the mobile subscriber, wherein the interactive service device resides at an Internet Protocol (IP) address that is accessed to cause the interactive service device to operate.

2. The method of claim 1, wherein the routing is performed by an inter-carrier vendor.

3. The method of claim 1, further comprising billing the mobile subscriber via a billing system of the mobile subscriber's mobile service provider.

4. The method of claim 1, wherein the SMS message is addressed to a common short code.

5. The method of claim 2, wherein the inter-carrier vendor dispatches an inquiry to an application provider.

6. The method of claim 5, wherein the inquiry comprises validating content of the SMS message.

7. The method of claim 6, wherein the validating comprises confirming that the interactive service device associated with the SMS message is available for use.

8. The method of claim 6, wherein the validating comprises acquiring applicable billing parameters from the application provider.

9. The method of claim 5, wherein the application provider returns a response to the inquiry.

10. The method of claim 3, wherein the billing comprises dispatching a billing authorization request by an inter-carrier vendor to a network of the mobile subscriber's mobile service provider.

11. The method of claim 10, wherein access to the network is via a billing gateway.

12. The method of claim 11, wherein the inter-carrier vendor accesses the billing gateway via a third-party facilitator.

13. The method of claim 11, wherein the billing gateway analyzes the SMS message to provide a line-item billing record to appear on a billing statement associated with the mobile subscriber.

14. The method of claim 11, wherein the billing gateway dispatches a positive billing authorization response to the inter-carrier vendor.

15. The method of claim 10, wherein the inter-carrier vendor dispatches a billing confirmation message to the application provider confirming successful completion of billing to the mobile subscriber.

16. The method of claim 15, wherein after receipt of the billing confirmation message to the application provider, the application provider dispatches an authorization message to the interactive service device authorizing the desired service.

17. The method of claim 16, wherein the authorization message is processed by the inter-carrier vendor.

18. The method of claim 16, wherein the interactive service device dispatches an acknowledgement message to the application provider acknowledging that the desired service has been initiated.

19. The method of claim 18, wherein the acknowledgement message is processed by the inter-carrier vendor.

20. The method of claim 1, wherein an application provider dispatches a service confirmation message to the mobile subscriber confirming that the desired service has been initiated.

21. The method of claim 20, wherein the service confirmation message is processed by the inter-carrier vendor.

22. The method of claim 20, wherein the service confirmation message further confirms that billing for the desired service has occurred.

23. The method of claim 1, wherein the interactive service device comprises at least one of a parking meter, a vending machine, a washing machine, a clothes dryer, an ATM, a pay phone, and an internet kiosk.

24. A method for providing message-based interactive services, comprising:
   receiving a short message service (SMS) message from a mobile subscriber relating to service desired by the mobile subscriber from an interactive service device, the SMS message being addressed to a short code and including in a body thereof an identification of the interactive service device, wherein the short code is different from the identification of the interactive service device;
   routing the SMS message to an inter-carrier vendor for processing such that the interactive service device is caused to operate to effect the service desired by the mobile subscriber;
   receiving an SMS message addressed to a mobile device of the mobile subscriber indicating that the interactive service device has completed the service desired by the mobile subscriber; and
   routing the SMS message addressed to the mobile device of the mobile subscriber for delivery to the mobile subscriber,
   wherein the interactive service device does not communicate via SMS for purposes of being caused to operate to effect the service desired by the mobile subscriber,
   wherein the interactive service device resides at an Internet Protocol (IP) address that is accessed to cause the interactive service device to operate.

25. The method of claim 24, wherein the SMS message is addressed to a universal short code.

* * * * *

UNITED STATES PATENT AND TRADEMARK OFFICE
CERTIFICATE OF CORRECTION

| | | |
|---|---|---|
| PATENT NO. | : 8,055,283 B2 | Page 1 of 1 |
| APPLICATION NO. | : 11/098405 | |
| DATED | : November 8, 2011 | |
| INVENTOR(S) | : Robert C. Lovell, Jr. | |

It is certified that error appears in the above-identified patent and that said Letters Patent is hereby corrected as shown below:

On the Title Page of the Patent, Item [73] Assignee: replace "Sybase 265, Inc." with
-- Sybase 365, Inc. --.

Signed and Sealed this
Twenty-ninth Day of May, 2012

David J. Kappos
*Director of the United States Patent and Trademark Office*